Figure 1:
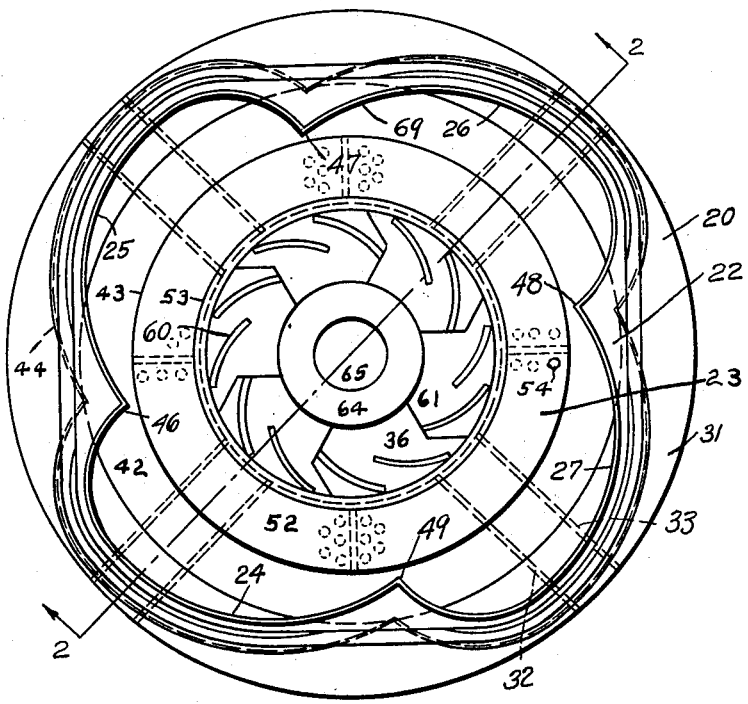

Sept. 27, 1960 R. W. POLLEYS 2,954,174
BATCH PULPER
Filed June 19, 1957 2 Sheets-Sheet 1

INVENTOR.
RICHARD W. POLLEYS.
BY
Pearson + Pearson
ATTORNEYS.

Sept. 27, 1960  R. W. POLLEYS  2,954,174
BATCH PULPER
Filed June 19, 1957  2 Sheets-Sheet 2

INVENTOR.
RICHARD W. POLLEYS.
BY
Pearson + Pearson
ATTORNEYS.

United States Patent Office 2,954,174
Patented Sept. 27, 1960

2,954,174

BATCH PULPER

Richard W. Polleys, North Andover, Mass., assignor to John W. Bolton & Sons, Inc., Lawrence, Mass., a corporation of Massachusetts Filed June 19, 1957, Ser. No. 666,681

5 Claims. (Cl. 241—74)

This invention relates to batch pulpers for converting fibrous paper stock material into pulp.

Apparatus of this type has usually included a tank with a rotary impeller therewithin, the pulp and liquid being subjected to the action of the impeller for a predetermined time and the entire batch then discharged from the tank.

In U.S. Patent 2,641,971 to Ellis of June 16, 1953 a pulper tank is disclosed in which the vertical side wall is formed into concave lobes and in which the tank bottom is flat and horizontal. The material emitted from the impeller strikes the vertical side wall with considerable impact and then travels along the lobate side wall until it is redirected toward the axis of the tank. A central vortex leading back to the impeller is thus created which produces a desirable disintegration effect as well as a mixing of the material.

It is the principal object of this invention to provide a batch pulper apparatus wherein the material emitted horizontally from the impeller contacts an inclined deflector with moderate impact and is deflected upward against a lobate side wall which also provides moderate impacts. Undue shortening, or fracture of, the fibres due to the target effect of a vertical tank wall is thus avoided.

Another object of the invention is to provide such a batch pulper aparatus wherein the lobate walled tank, inclined deflector plate and impeller may all be used in a continuous pulping apparatus without changing the design thereof.

Another object of the invention is to provide a lobate side wall on a pulper tank which converges inwardly to avoid dead spots around the upper portion of the tank and to provide an outwardly divergent deflector around the bottom of the tank to prevent dead spots around the lower portion of the tank.

A further object of the invention is to provide a lobate walled pulper tank with a truncated, conical, outwardly divergent, bottom portion, the said truncated, conical portion permitting free circulation circumferentially below the plane of the impeller but guiding stock into the lobes above the plane of the impeller.

Still another object of the invention is to provide a lobate walled batch pulper with a bottom formed by an outer, imperforate, truncated, conical portion, an intermediate, perforate horizontal portion and an inner imperforate conical portion, the latter constituting a conical cap on the rotating axial impeller. The vortex and disintegrating action of the lobate side wall is thus increased and material is prevented from accumulating in dead spots.

A still further object of the invention is to provide a lobate walled pulper tank with a truncated conical peripheral portion on the tank bottom and an annular discharge, or extraction, screen encircling the impeller and encircled by the said peripheral portion. The perforations in the screen are thus continually swept both radially and circumferentially by the streams emitted from the impeller while gravity tends to completely clear the tank during dumping of the batch.

Figure 2:
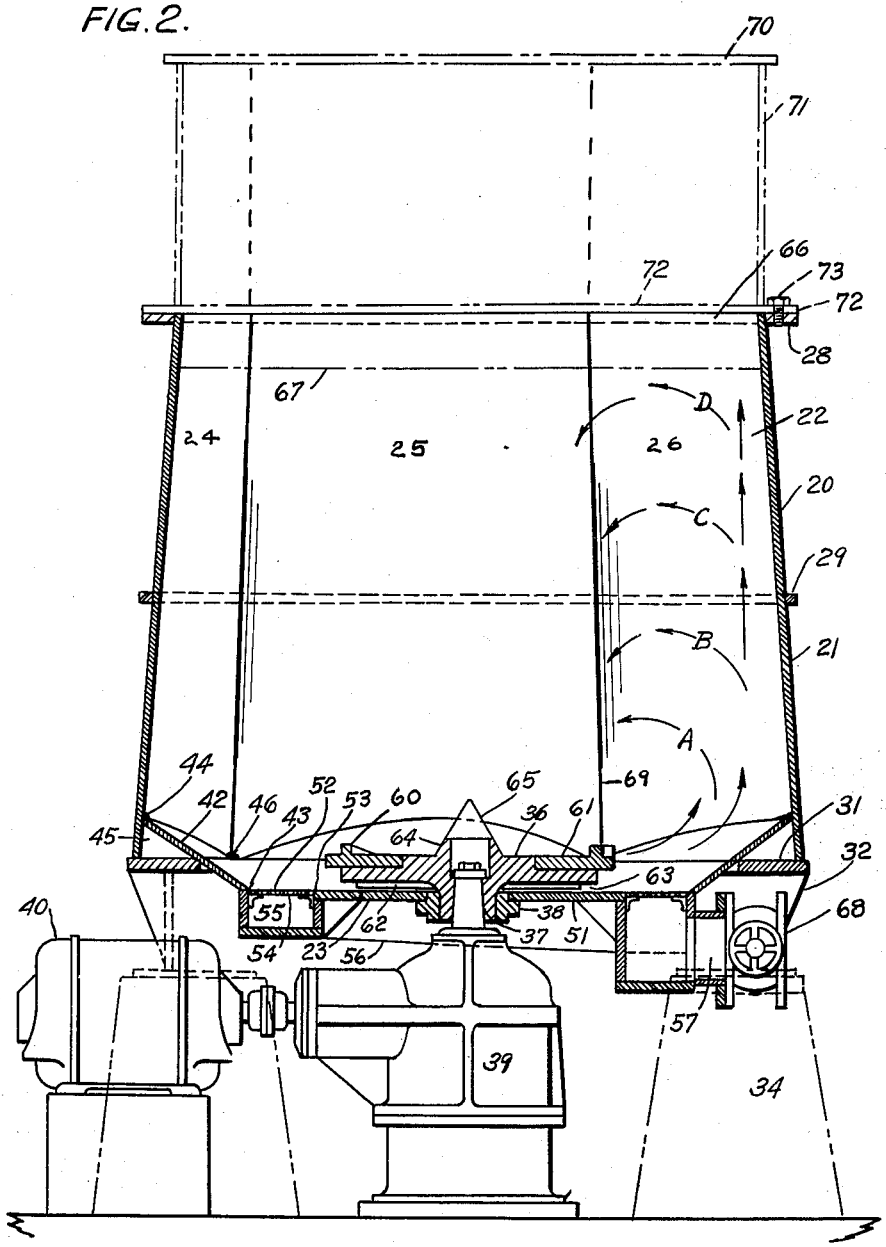

Other objects and advantages of the invention will be apparent from the claims, the description of the drawings and from the drawings in which:

Fig. 1 is a plan view of the apparatus of the invention.
Fig. 2 is a side view in section on line 2—2 of Fig. 1.

As shown in the drawings, 20 is a batch pulper constructed in accordance with the invention. The pulper 20 includes a tank 21 having an upwardly extending concave-lobed side wall 22 and a tank bottom 23. The side wall 22 is inwardly convergent rather than vertical preferably at an angle of about five degrees from the vertical. Preferably also, the side wall 22 is formed into four identical concave lobes 24, 25, 26 and 27 of non uniform curvature arranged uniformly with respect to the axis of the tank. Tank 21 is provided with a horizontally extending flange rim 28 and one or more reinforcing rings such as 29, both of which conform to the lobate shape of the side wall 22.

The side wall 22 is supported on a horizontal ring 31, the ring 31 being in turn supported by a pair of vertical plates such as 32 and 33, in turn supported on a pillar such as 34 in each of the four quadrants therearound. A typical embodiment of the invention may comprise a tank nine feet high, ten feet diameter at the bottom of the tank and nine feet diameter at the top of the tank, the basic capacity being about six hundred cubic feet.

A rotary impeller 36 is mounted for axial rotation in the bottom portion of the tank 21 by means of a shaft 37 rotatable in a suitable packing box 38 in the tank bottom 23. Shaft 37 is rotated by a gear reducer 39 which in turn is powered by an electric motor 40.

The bottom 23 of pulper 20 is provided with an outer, truncated conical, portion 42 which diverges outwardly from a circular inner periphery 43 to a lobate outer periphery 44. The truncated conical portion 42 is imperforate and serves as a filler for eliminating the dead spots or areas such as 45 in the lower outside corner of the pulper 20. As shown the lobate periphery 44 is welded or otherwise joined to the lobes 24, 25, 26 and 27 and the lowermost points such as 46, 47, 48 and 49 of the lobate line of joinder are in the horizontal plane of the impeller 36. The truncated, conical portion 42 is thus a deflector plate and for convenience I call the upper half thereof the "cloverleaf" portion because it comprises four lobed sections and I call the lower half thereof the "cup shaped portion" because it has a full truncated conical wall.

The impeller 36 is substantially coextensive with the inner, or central, annular imperforate portion 51 of bottom 23 and substantially covers the same. An intermediate annular perforate portion 52 of bottom 23 extends horizontally from the inner periphery 43 of portion 42 to the outer periphery 53 of the portion 51, below and parallel to the plane of impeller 36. The perforations 54 in the annular portion 52 are preferably about one inch in diameter and closely spaced and an annular discharge conduit 55 is mounted thereunder. Conduit 55 includes an inclined bottom wall 56 leading to the discharge opening 57 and the conduit may also be used to fill the tank with liquid, or add liquid after pulping by suitable valving, not shown.

Impeller 36 includes a plurality of identical curved blades such as 60 mounted in pairs on detachable plates 61 and tending to propel material outwardly and horizontally in the direction of the truncated conical outer portion 42 of bottom 23. In addition, suitable blades 62 are mounted below impeller 36 to clear the space 63 thereunder of material and to continuously urge such material radially and circumferentially across the perforations 54 and up the portion 42. Impeller 36 also includes an upstanding conical portion 64, including a threadedly removable cap 65.

In operation, suitable pulping liquid such as water, is introduced into tank 21 through conduit 55 and perforations 54 and fibrous paper stock material is introduced through the top opening 66 until the desired stock level is reached such as shown by the dotted line 67. The control valve 68 is closed and the impeller 36 is rotated by motor 40 and reducer 39 to commence the pulping period.

If a bale of pulp or the like is in the tank, it will be drawn down to the impeller and gradually disintegrated. The larger chunks will be propelled generally horizontally against the truncated conical portion 42 of bottom 23 with a glancing or ricochet type impact whence the chunks are deflected upwardly above the plane of the impeller and into the lobes of side wall 22. As shown by the arrows marked "A" the larger chunks travel upwardly only a short distance at the same time they are moving circumferentially until they again glance or ricochet off the sloping face of the upstanding wall 69 of a lobe such as 26. This directs such chunks back to the axis of the tank 21 where the vortex created by the impeller and lobes draws the chunks back down the axis into a glancing blow by the conical portion 64 of impeller 36. The larger chunks gradually break up into smaller and lighter chunks which tend to follow the course of the arrows B and still smaller fibre bundles follow the arrow course C while the material following the course D approaches the pulp characteristics desired. The inwardly divergent tank wall 22 not only helps to avoid dead areas around the top of the tank but also tends to urge the material continuously back into the vortex of the pulper.

Since the lobate portion of the structure reaches down only to the level of the impeller 36, the tank bottom below the impeller is a truncated conical outwardly divergent cup shape floored by the perforations 54 of the bottom portion 52. The action of the blades 62 is to continuously sweep across the perforations 54 both radially and circumferentially to urge chunks up into the lobate section as well as to clear the perforations from plugging. Conduit 55 is, of course, full of liquid thus tending to float off any material settling to the bottom if such material withstands the circulating effect of the impeller blades.

Upon completion of the pulping, the control valve 68 may be opened to dump the contents of pulper 20 with the impeller still revolving to clear the perforations 54. Toward the end of the charge the impeller urges the material outwardly and the truncated conical portion 52 guides the material downwardly by gravity so that the entire pulper is completely drained.

If desired, an upward tank extension 70, having a lobate vertical side wall 71 conforming to the lobed side wall 22, may be mounted by its flanged rim 72 on the rim 28 by bolts 73. Side wall 71 may be vertical rather than inwardly divergent because it takes no part in the pulping action. Instead, after a basic charge of a predetermined consistency has been pulped in tank 21, additional liquid may be introduced through conduit 55 to reduce the consistency and then the diluted charge is dumped.

I claim:

1. Apparatus for treating fibrous paper stock material, said apparatus comprising a tank having a side wall provided with four upwardly extending, concave lobes and a bottom provided with a central, horizontal, perforated screen portion and a peripheral upwardly divergent, truncated, conical deflector portion, said conical deflector portion having a lobate periphery joined to said lobate side wall, and a rotary impeller mounted for axial rotation in said tank in the horizontal plane of the lowermost points of the lobes of said side wall and of the lowermost points of the lobate periphery of the truncated conical deflector portion of said tank bottom and at a spaced distance above said perforated screen portion whereby stock is freely and circumferentially circulated in the space below said impeller but subjected to lobular side wall impact above the level of said impeller.

2. A batch pulper comprising in combination a tank having an upstanding, inwardly convergent side wall provided with four upwardly extending concave lobes of non-uniform curvature, uniformly spaced from the axis of the tank, a rotary impeller axially rotatable in a horizontal plane proximate the bottom of the tank and adapted to propel pulp outwardly in a generally horizontal direction and an outwardly divergent, truncated, conical deflector plate extending around the outside of the bottom of said tank at a spaced distance from said impeller with the central horizontal plane of said deflector plate being in the path of material emitted from said impeller, said plate having a lobate upper peripheral portion reaching substantially above the level of said impeller and joined to the lobes of said side wall and a lower peripheral, non-lobate portion below the lobes of said side wall, and reaching substantially below the level of said impeller to form an unobstructed cup-shaped space for free circumferential circulation of stock.

3. Apparatus for treating fibrous paper stock material, said apparatus comprising a tank having a side wall provided with four upwardly extending, concave lobes and a bottom provided with a central horizontal portion and a peripheral, upwardly divergent, truncated conical, deflector plate, said deflector plate having a lobate upper peripheral edge joined to said lobate side wall and having an upper cloverleaf portion and a lower cup shaped portion and a rotary impeller mounted for axial rotation in said tank in the horizontal plane of the meeting line between the cloverleaf portion and the cup shaped portion of said deflector plate, said impeller and deflector plate permitting free circulation circumferentially below the plane of the impeller but glancing stock off said plate into engagement with said lobate side wall above the plane of the impeller.

4. Apparatus as specified in claim 3 wherein said concave lobed side wall converges upwardly at an angle of about five degrees from the vertical and the truncated conical deflector plate of said bottom diverges upwardly at an angle of about thirty degrees from the horizontal.

5. Apparatus as specified in claim 3 plus blades mounted underneath said impeller for clearing the space thereunder at the level of the cup shaped portion of said deflector plate.

References Cited in the file of this patent

UNITED STATES PATENTS

| | | |
|---|---|---|
| 94,005 | King | Aug. 24, 1869 |
| 2,028,595 | Flegel | Jan. 21, 1936 |
| 2,371,837 | Martindale | Mar. 20, 1945 |
| 2,424,726 | Wells | July 29, 1947 |
| 2,434,449 | Wells | Jan. 13, 1948 |
| 2,557,174 | Cowles | June 19, 1951 |
| 2,641,971 | Ellis | June 16, 1953 |
| 2,653,520 | Karlsson | Sept. 29, 1953 |
| 2,674,927 | Wicksell | Apr. 13, 1954 |
| 2,707,420 | Skardal et al. | May 3, 1955 |

FOREIGN PATENTS

| | | |
|---|---|---|
| 70,549 | Netherlands | Aug. 15, 1952 |
| 167,612 | Austria | Feb. 10, 1951 |